United States Patent
Man et al.

(10) Patent No.: US 11,368,697 B1
(45) Date of Patent: Jun. 21, 2022

(54) ADAPTIVE IMAGE COMPRESSION USING A QUALITY METRIC

(71) Applicant: GOOGLE LLC, Mountain View, CA (US)

(72) Inventors: Haoran Man, San Bruno, CA (US); Jingyu Cui, Milpitas, CA (US); Abraham Stephens, San Mateo, CA (US); Venkatesan Esakki, San Jose, CA (US); Pascal Massimino, Cupertino, CA (US); Feng Yang, Sunnyvale, CA (US); Cecilia Rabess, San Francisco, CA (US)

(73) Assignee: Google LLC, Mountain View, CA (US)

( * ) Notice: Subject to any disclaimer, the term of this patent is extended or adjusted under 35 U.S.C. 154(b) by 1041 days.

(21) Appl. No.: 15/968,302

(22) Filed: May 1, 2018

(51) Int. Cl.
*H04N 19/136* (2014.01)
*H04N 19/124* (2014.01)
*G06V 10/98* (2022.01)

(52) U.S. Cl.
CPC ......... *H04N 19/136* (2014.11); *G06V 10/993* (2022.01); *H04N 19/124* (2014.11); *G06T 2207/30168* (2013.01)

(58) Field of Classification Search
CPC .... H04N 19/136; H04N 19/124; G06K 9/036; G06T 2207/30168
See application file for complete search history.

(56) References Cited

U.S. PATENT DOCUMENTS

| | | | |
|---|---|---|---|
| 6,665,425 B1 * | 12/2003 | Sampath | H04N 1/00002 358/1.15 |
| 10,930,017 B1 * | 2/2021 | Blackburne | G06T 9/00 |
| 2012/0201476 A1 * | 8/2012 | Carmel | H04N 19/60 382/239 |
| 2012/0224776 A1 * | 9/2012 | Tzannes | H04N 19/172 382/235 |
| 2017/0150145 A1 * | 5/2017 | Kennedy | H04N 19/137 |
| 2017/0195674 A1 * | 7/2017 | Kim | H04N 19/115 |
| 2017/0324958 A1 * | 11/2017 | Tandon | H04N 19/172 |
| 2017/0366814 A1 * | 12/2017 | Adsumilli | H04N 13/243 |
| 2017/0372467 A1 * | 12/2017 | Carmel | G06T 7/0002 |
| 2018/0247155 A1 * | 8/2018 | Itan | G06K 9/4642 |
| 2019/0026555 A1 * | 1/2019 | Cabral | G06F 16/583 |

* cited by examiner

*Primary Examiner* — John B Strege
(74) *Attorney, Agent, or Firm* — Brake Hughes Bellermann LLP

(57) ABSTRACT

A method includes compressing an image using a quality setting, determining a quality of the compressed image based on a quality metric, and determining if the quality of the compressed image is within a quality range. In response to determining the quality of the compressed image is within the quality range, store the compressed image; and in response to determining the quality of the compressed image is not within the quality range, modify the quality setting, and repeat the compressing step with the modified quality setting, both determining steps, and the applicable in response to step.

20 Claims, 5 Drawing Sheets

ADAPTIVE IMAGE COMPRESSION USING A QUALITY METRIC

FIELD

Implementations relate to adaptive image compression.

BACKGROUND

An ideal quality setting when compressing an image is typically different for optimizing storage (e.g., minimizing memory usage) and for optimizing a user-experience (e.g., maximizing reconstructed image quality). The difference in content details (e.g., contrast, color, intensity, texture and the like) of the image typically affects how much a certain image can be compressed. In other words, image compression techniques generally do not consider image content when compressing an image resulting in excessive storage memory usage and/or reduced reconstructed image quality.

SUMMARY

Example implementations describe systems and methods to adaptively compress an image using parameters (e.g., a quality setting) that are modified based on a compressed image quality.

In a general aspect a method and a non-transitory computer-readable storage medium having stored thereon computer executable program code which, when executed on a computer system, causes the computer system to perform steps. The steps include compressing an image using a quality setting, determining a quality metric of the compressed image, and determining if the quality of the compressed image measured by the quality metric is within a quality range. In response to determining the quality of the compressed image is within the quality range, store the compressed image; and in response to determining the quality of the compressed image is not within the quality range, modify the quality setting, and repeat the compressing step with the modified quality setting, both determining steps, and the applicable in response to step.

In another general aspect a method includes selecting a quality metric, determining a target quality for the quality metric, determining a minimum quality setting, determining a maximum quality setting, calculating a quality setting as equal to the sum of the minimum quality setting and the maximum quality setting divided by two, compressing an image using the quality setting, determining calculating current quality using quality metric based on the image and the compressed image, and determining if a difference between the current quality and the target quality is less than a threshold value. The quality range can be from a target quality minus a threshold value to target quality plus the threshold value. In response to determining the difference between the current quality and the target quality is less than the threshold value, store the compressed image. In response to determining the difference between the current quality and the target quality is not less than the threshold value, determine if the current quality is greater than the target quality, in response to determining the current quality is greater than the target quality, set the minimum quality setting equal to the current quality setting, in response to determining the current quality is not greater than the target quality, set the maximum quality setting equal to the current quality setting, and repeat the calculating step, the compressing step, both determining steps, and the applicable in response to steps.

Implementations can include one or more of the following features. For example, if peak signal to noise ratio (PSNR) is chosen as quality metric and JPEG as image format, determining the quality metric of the compressed image can include calculating the PSNR based on the image and the compressed image, and the quality range can include a minimum value equal to a target PSNR and a maximum value equal to the target PSNR plus a threshold value. For example, if modifying the quality setting can includes determining if the quality metric of the compressed image is above a maximum value, determining if the quality metric of the compressed image is below a minimum value, in response to determining the quality metric of the compressed image is above the maximum value, modify the quality setting to cause the quality metric of the compressed image to be reduced, and in response to determining the quality metric of the compressed image is below the minimum value, modify the quality setting to cause the quality metric of the compressed image to be increased.

For example, the quality metric can include one of a peak signal to noise ratio (PSNR), a structural similarity (SSIM), a perceptual distortion metric, a Sarnoff Just-Noticeable Difference (JND), a Visible Differences Predictor (VDP), a Visual Information Fidelity (VIF), an application-specific model or a file size. Before the image is compressed using the quality setting, the quality setting can be predicted using a machine learning technique. The quality setting can correspond to a number of discrete quantum values used in a quantization step for compressing the image. The quality setting can correspond to a quantization table used in a quantization step for compressing the image. The quality setting can correspond to a ZBIN value used in a quantization step for compressing the image (WebP image format).

BRIEF DESCRIPTION OF THE DRAWINGS

Example implementations will become more fully understood from the detailed description given herein below and the accompanying drawings, wherein like elements are represented by like reference numerals, which are given by way of illustration only and thus are not limiting of the example implementations and wherein.

Figure 1:
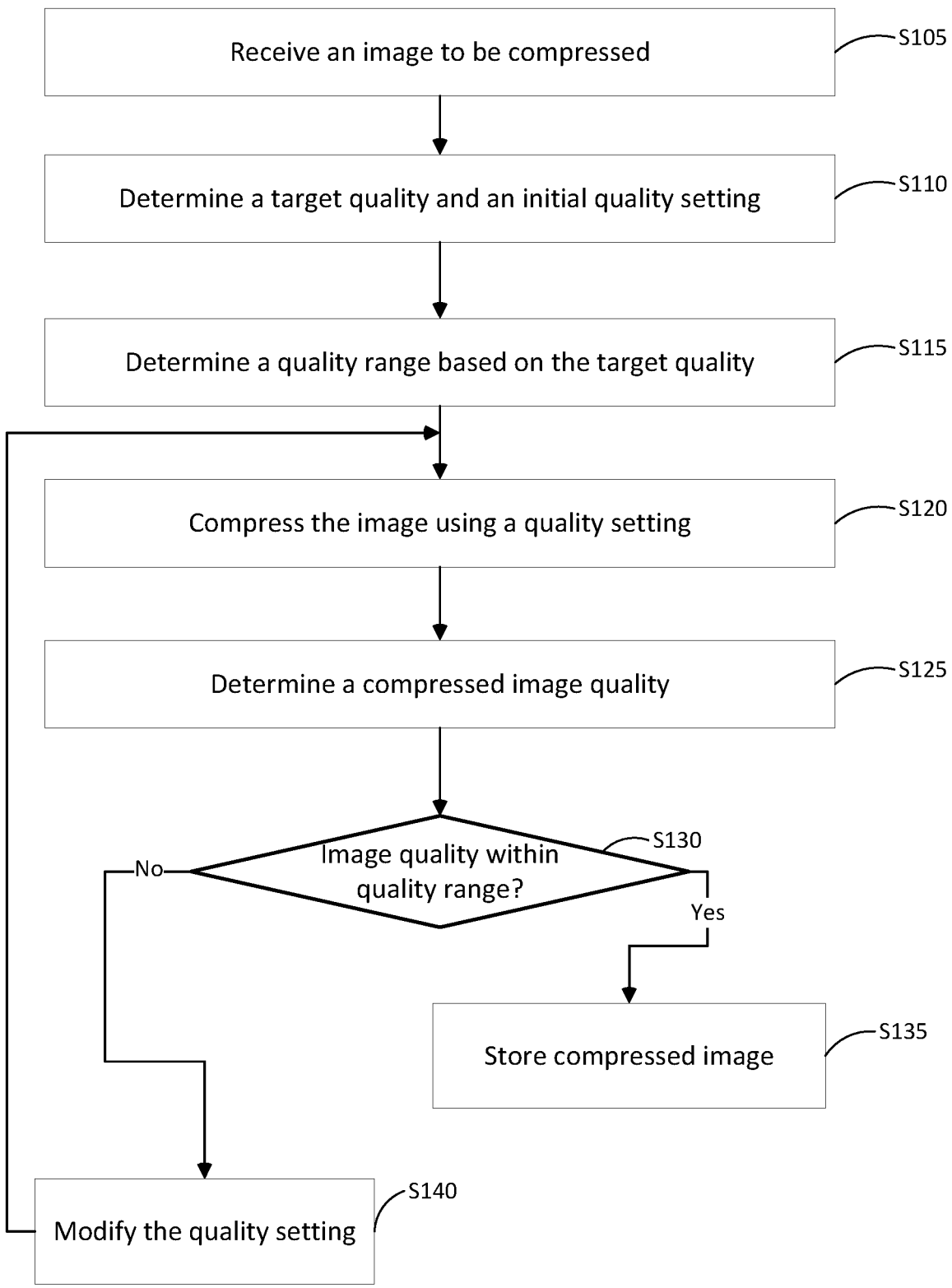
FIGS. 1 and 2 illustrate methods for compressing images according to at least one example implementation.

It should be noted that these Figures are intended to illustrate the general characteristics of methods and/or structure utilized in certain example implementations and to supplement the written description provided below. These drawings are not, however, to scale and may not precisely reflect the precise structural or performance characteristics of any given implementation, and should not be interpreted as defining or limiting properties encompassed by example implementations. For example, the positioning of structural elements may be reduced or exaggerated for clarity. The use of similar or identical reference numbers in the various drawings is intended to indicate the presence of a similar or identical element or feature.

DETAILED DESCRIPTION

While example implementations may include various modifications and alternative forms, implementations thereof are shown by way of example in the drawings and will herein be described in detail. It should be understood, however, that there is no intent to limit example implementations to the particular forms disclosed, but on the contrary, example implementations are to cover all modifications, equivalents, and alternatives falling within the scope of the claims. Like numbers refer to like elements throughout the description of the figures.

Example implementations describe systems and methods configured to compress an image at a lowest quality setting possible that while maintaining a desired user experience (e.g., quality) in order to minimize storage memory usage. For example, two images each having different content can be compressed using a same quality setting. However, after reconstruction of the compressed images, the first reconstructed image could have a higher quality than the second image. Therefore, the first image used more memory than was necessary to store the first image. Accordingly, the adaptive image compression techniques described herein are configured to compress the first image at a lower quality setting than would otherwise have been used. This results in using less memory to store the compressed image. Considering the large number of compressed images stored on computing devices, using the adaptive image compression techniques described herein can result in using significantly fewer storage resources as compared to other image compression techniques.

In an example implementation, in order to preserve a desired quality of an original (e.g., uncompressed) image based on the content of the original image, the original image can be compressed at different target quality levels. For example, given a quality metric M, a target quality (M_target) can be determined that is satisfactory for specific scenario S. An example scenario can include social network websites where most users will view the image in a web browser, in this case, the quality can be low. However, for some other cases (e.g., photo auto-backup) user will have a higher expectation of compressed image quality. A quality setting(s) qs for an image (img) can be adaptively selected such that a final quality setting (qs_final) is the lowest qs that satisfies M(img(qs))>=M_target. If the quality metric M is a representative metric for quality for scenario S, and M_target is the satisfactory quality, then an adaptive compression technique can result in a lowest storage cost (e.g., memory usage).

The adaptive compression technique can be configured to iteratively search for qs_final. Accordingly, the adaptive compression technique can compress the image at a quality setting (qs_0) in an initial iteration and measure M_0=M(img@qs_0). Then, in subsequent iterations, if M_0>M_target, qs is modified to be a lower qs and if M_0<M_target, qs is modified to be a higher qs. The image is compressed using the modified qs until convergence (e.g., until M(img(qs))≥M_target, by modifying qs results in or below a threshold change in M, until M is between M_target and M_max, and the like).

Figure 2:
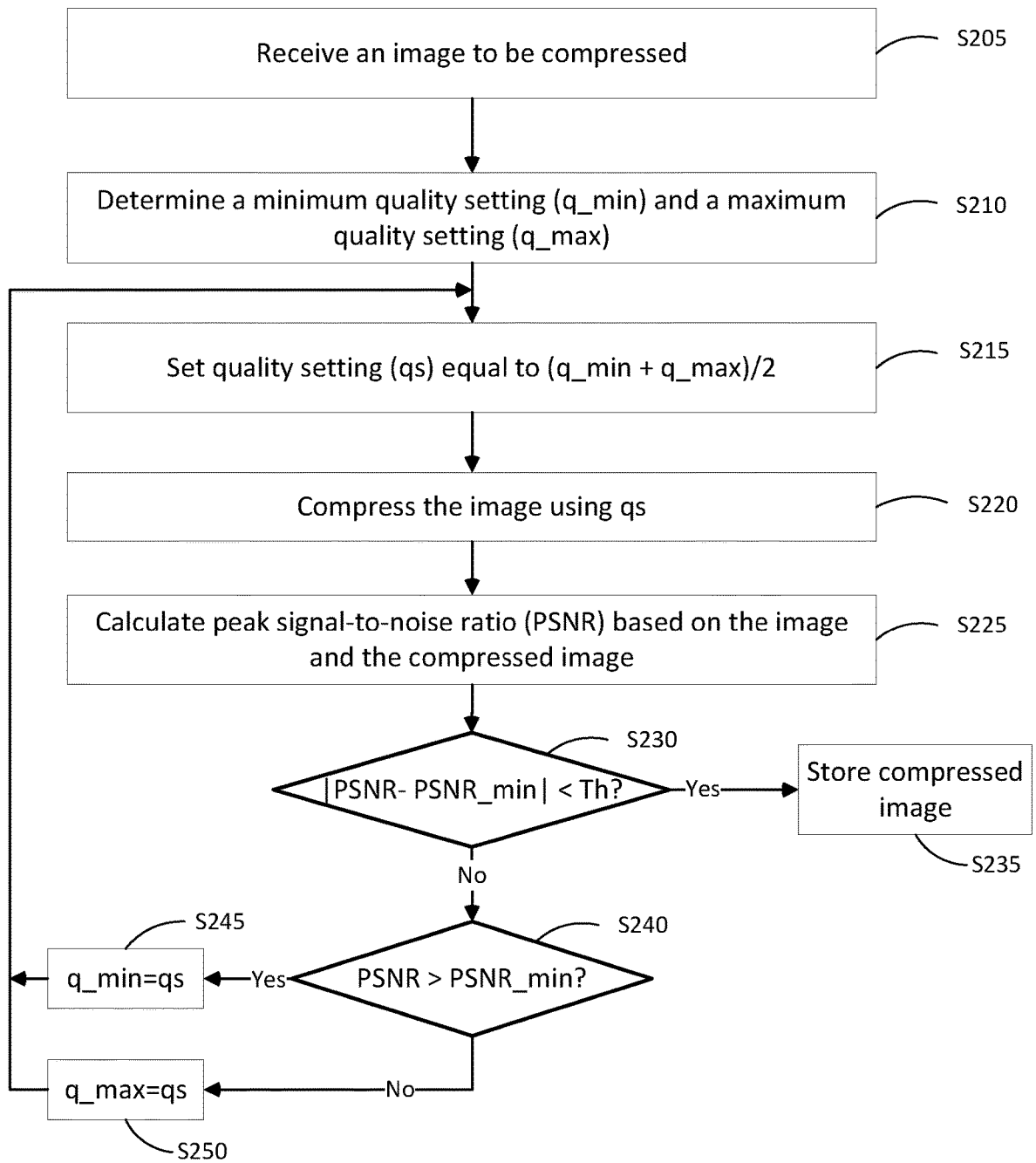
Figure 3:
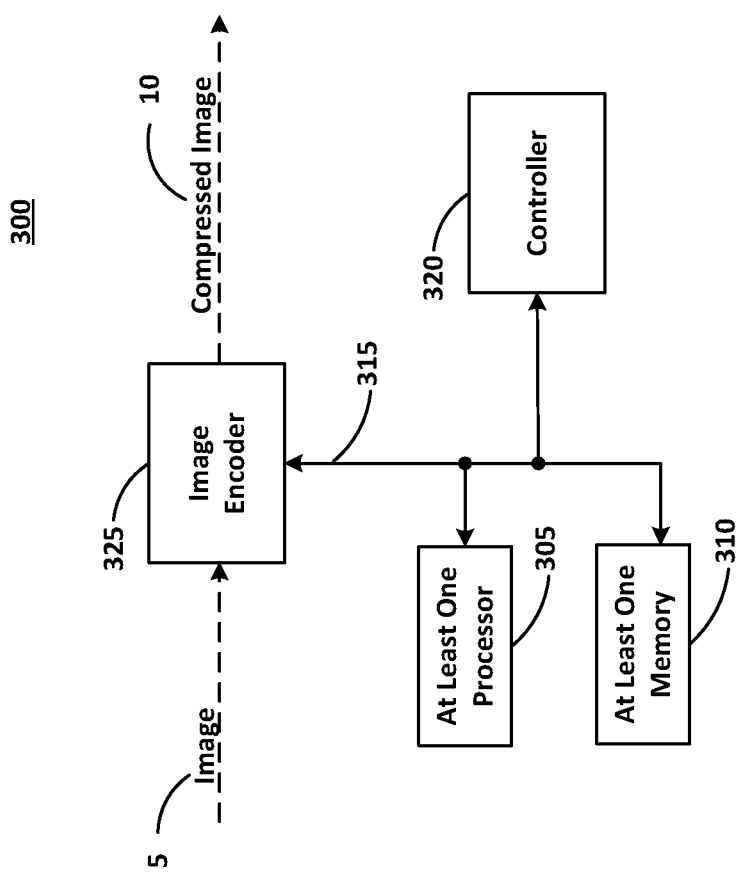
FIG. 3 illustrates an image encoder system according to at least one example implementation.
Figure 4:
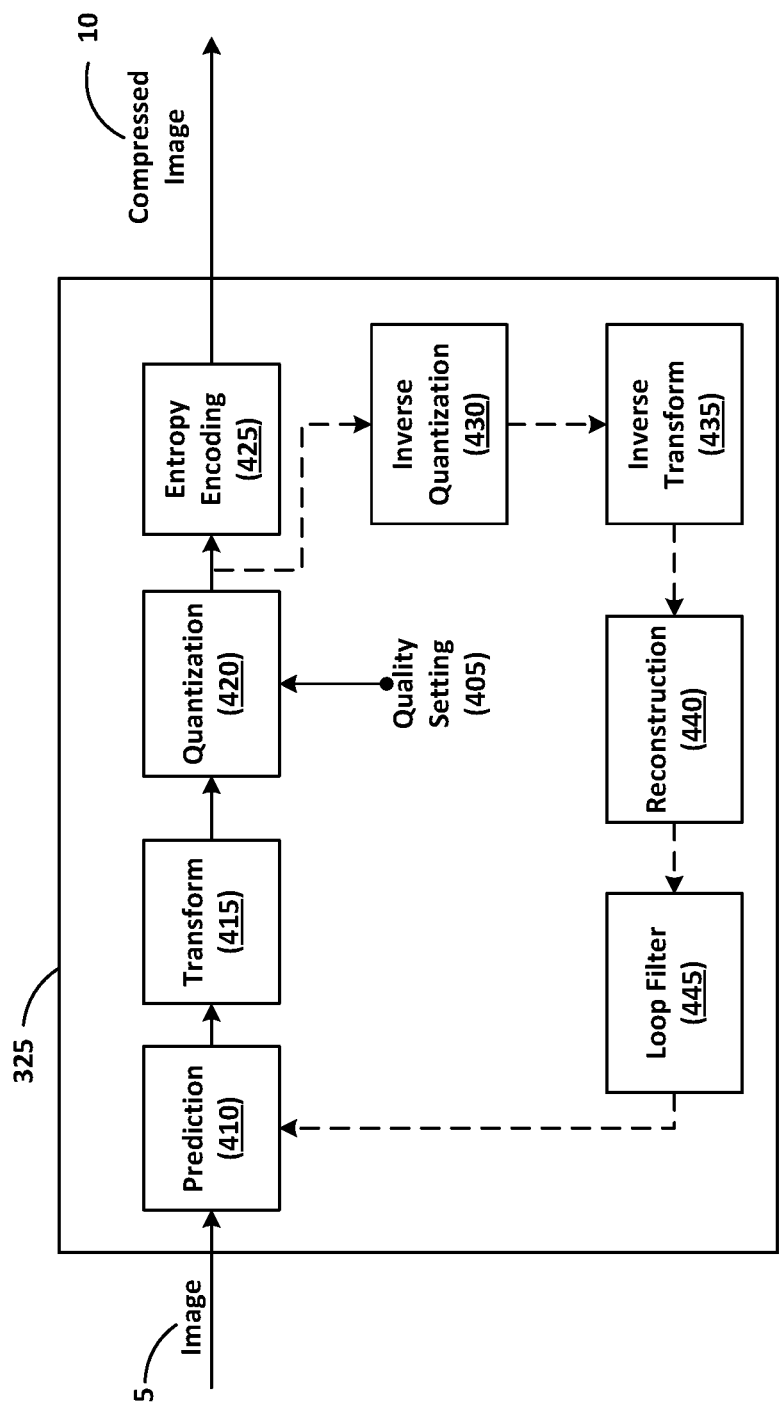
FIG. 4 illustrates a flow diagram for an image encoder system according to at least one example implementation.

FIGS. 1 and 2 are flowcharts of methods according to example implementations. The steps described with regard to FIGS. 1 and 2 may be performed due to the execution of software code stored in a memory (e.g., at least one memory 310) associated with an apparatus (e.g., as shown in FIGS. 3, and 4 (described below)) and executed by at least one processor (e.g., at least one processor 305) associated with the apparatus. However, alternative implementations are contemplated such as a system embodied as a special purpose processor like Application-specific integrated circuit (ASIC). Although the steps described below are described as being executed by a processor, the steps are not necessarily executed by a single processor. In other words, at least one processor may execute the steps described below with regard to FIGS. 1 and 2.

FIG. 1 illustrates a method for adaptively compressing an image. As shown in FIG. 1, in step S105 an image to be compressed is received (e.g., by image encoder 325). For example, the image may be a real time image (e.g., an image recently captured by a camera, a mobile phone and/or the like). For example, the image may be a previously recorded image (e.g., an image stored in memory).

In step S110 a target quality and initial quality setting is determined. For example, the target quality can be a desired quality indicated by a user (e.g., in an application) and/or a quality standard (e.g., as defined by a contract, a standards body, a back-up system, and the like). In an example implementation, the target quality can be high, medium, or low, where high, medium, and low represent a target quality level predefined in an encoder (e.g., image encoder 325). The quality setting can be calculated based on a system characteristic. For example, the target quality can be calculated based on system bandwidth (e.g., if a compressed image is to be communicated to a remote device or storage system) and/or memory usage (e.g., a maximum amount of memory that can be allocated to the compressed image for storage.

In step S115 a quality range is determined based on the target quality. For example, the target quality can be a numerical value and the quality range can be a range of numerical values including the target quality. The quality range can be the target quality plus or minus a predetermined value. The quality range can include the target quality as a maximum with a minimum equal to the target quality minus a predetermined value. The quality range can include the target quality as a minimum with a maximum equal to the target quality plus a predetermined value.

For example, a quality measure of a compressed image can be tested based on a quality metric and the quality range can be based on the quality metric and the quality setting. In an example implementation, a lookup table can include a maximum value for the quality metric and/or a minimum value for the quality metric. The maximum value for the quality metric and/or the minimum value for the quality metric can be selected from the lookup table using the target quality.

In step S120 the image is compressed using a quality setting. In an initial iteration, the quality setting can be the initial quality setting. For example, an image encoder may transform and quantize the image. For example, transforming the image may include converting the values of pixels from the spatial domain to transform coefficients in a transform domain. For example, quantizing the current image may include reducing data in each transformation coefficient.

The image can be compressed using an encoding scheme (or standard). The encoding scheme may include one or more settings utilized by the image encoder for transforming and/or quantizing the image. The one or more settings may affect an amount of time, a quality, a compression ratio, and/or the like that the image encoder takes when transforming and/or quantizing the current image. In an example implementation, the quality setting can be used to vary the quantization of a transformed image. In an example implementation, the encoding scheme can be based on an image format, type or standard (e.g., JPEG, WebP, GIF, PNG, TIFF and the like).

In step S125 a compressed image quality is determined. For example, a quality metric can be used to test the quality of the compressed image. In example implementations, the quality metric can include (and is not limited to) peak signal to noise ratio (PSNR), structural similarity (SSIM), perceptual distortion metric, Sarnoff Just-Noticeable Difference (JND), Visible Differences Predictor (VDP), Visual Information Fidelity (VIF), application-specific models (e.g., DCTune, machine learning derived models, and the like), and/or file size.

In some implementations, a reconstructed compressed image is compared to the original image. For example, a PSNR can be calculated based on a pixel-wise comparison of the original image to a reconstructed compressed image. The Sarnoff JND can be used to predict a perceptual rating that a human will assign to the reconstructed compressed image relative to the original image. In some implementations, the quality metric is based on the reconstructed compressed image alone. For example, a file size of the reconstructed compressed image may be compared to a threshold value.

In step S130 a determination can be made whether the compressed image quality is within the quality range. For example, whether or not the compressed image quality is between the maximum value for the quality and the minimum value for the quality can be determined. For example, whether or not the compressed image quality is below the maximum value for the quality can be determined. For example, whether or not the compressed image quality is above the minimum value for the quality can be determined. In step S135, if the image quality is within the quality range, the compressed image is stored. For example, the compressed image can be stored in a memory of the local (e.g., device performing the compression) or communicated to a remote device and stored on a memory of the remote device.

In step S140, if the image quality is not within the quality range, the quality setting can be modified. For example, if the quality of the compressed image is above the maximum value for the quality metric, the quality setting can be modified to cause a reduction of the quality of the compressed image in a subsequent compression step. Further, if the quality of the compressed image is below the minimum value for the quality metric, the quality setting can be modified to cause an increase of the quality of the compressed image in a subsequent compression step.

The quality setting can be an encoder parameter setting associated with a quantization block of the encoder. The quantization block of the encoder can be configured to convert the transform coefficients into discrete quantum values. The number of and/or value for the discrete quantum values can affect the quality of a reconstructed image. For example, a relatively high number of discrete quantum values can have a relatively higher quality of the reconstructed image. Conversely, a relatively low number of discrete quantum values can have a relatively lower quality of the reconstructed image. Further, the number of nonzero discrete quantum values can affect the quality of a reconstructed image. For example, a relatively high number of nonzero discrete quantum values can have a relatively higher quality of the reconstructed image. Conversely, a relatively low number of nonzero discrete quantum values can have a relatively lower quality of the reconstructed image. Accordingly, modifying the quality setting can include changing the number of and/or value for discrete quantum values used in the quantization block of the encoder (as discussed in more detail below). After modifying the quality setting processing returns to step S120.

FIG. 2 illustrates a method for adaptively compressing an image using peak signal to noise ratio (PSNR) as a quality metric. According to example implementations, the method described with regard FIG. 2 can be modified to implement any of the quality metrics referred to above. For example, FIG. 2 can be modified to implement SSIM, perceptual distortion metric, Sarnoff JND, VDP, VIF, application-specific models (e.g., DCTune, machine learning derived models, and the like), and/or file size as the quality metric. Further, example implementations are not limited to the listed quality metrics.

As shown in FIG. 2, in step S205, an image to be compressed is received (e.g., by image encoder 325). For example, the image may be a real time image (e.g., an image recently captured by a camera, a mobile phone and/or the like). For example, the image may be a previously recorded image (e.g., an image stored in memory).

In step S210, a minimum quality setting (q_min) and a maximum quality setting (q_max) are determined. In an example implementation, q_min and q_max can serve as search range of quality setting when searching for a target quality. In an example implementation, a lookup table can include a plurality of maximum values for the quality metric and/or a plurality of minimum values for the quality metric. The maximum value for the quality metric and/or the minimum value for the quality metric can be selected from the lookup table using a unique identifier (e.g., a key). The unique identifier can be based on a user input, an encoder setting, a reference quality, and/or the like. For example, the unique identifier could be high-quality (HC) for storing a backup image or mid-quality (MQ) for storing an image on a limited memory device (e.g., a mobile device). In step S215 a quality setting (qs) is set equal to (q_min+q_max)/2.

In step S220 the image is compressed using the quality setting. For example, an image encoder may transform and quantize the image. For example, transforming the image may include converting the values of pixels from the spatial domain to transform coefficients in a transform domain. For example, quantizing the current image may include reducing data in each transformation coefficient.

The image can be compressed using an encoding scheme (or standard). The encoding scheme may include one or more settings utilized by the image encoder for transforming and/or quantizing the image. The one or more settings may affect an amount of time, a quality, a compression ration, and/or the like that the image encoder takes when transforming and/or quantizing the current image. In an example implementation, the quality setting can be used to vary the quantization of a transformed image. In an example implementation, the encoding scheme can be based on an image format, type or standard (e.g., JPEG, WebP, GIF, PNG, TIFF and the like)

In step S225 a peak signal-to-noise ratio (PSNR) is calculated based on the image and the compressed image. For example, the PSNR can be calculated based on a pixel-wise comparison of the original image to a reconstructed compressed image. In an example implementation (and illustrated below), an encoder can include a reconstruction path (alternatively or in addition, a system can include an encoder and a decoder). The image generated by the elements in reconstruction path can be a reconstructed compressed image. Each pixel in the reconstructed compressed image is compared (e.g., color, intensity and the like) to each corresponding pixel from the original image to generate the PSNR. A code segment may be, for example, PSNR=PSNR(img@qs, img_orginal), where img@qs is the reconstructed compressed image and img_orginal is the original image.

In step S230 it can be determined if |PSNR−PSNR_min|<Th. For example, Th can be a threshold value set based on a convergence tolerance to PSNR_min. In other words, the adaptive compression technique can be considered complete when PSNR (image quality) approaches or is close to PSNR_min (a minimum image quality).

In step S235 if |PSNR−PSNR_min|<Th, the compressed image is stored. For example, the compressed image can be stored in a memory of the local device (e.g., the device performing the compression) or communicated to a remote device and stored on a memory of the remote device.

In step S240, if a determination is made that PSNR>PSNR_min, then processing continues to step S245, otherwise processing continues to step S250. In step S245, q_min can be set equal to qs and then processing returns to step S215. In step S250, q_max can be set equal to qs and then processing returns to step S215.

The methods described above can be modified using several techniques. In an example implementation, machine learning based on image statistics associated with an application implementing the methods can be used for selecting the initial quality setting and quality setting update. Machine learning can improve the processing of the technique (e.g., fewer iterations) over time. For example, determining the quality setting in step S110 and determining a minimum quality setting (q_min) and a maximum quality setting (q_max) in step S210 can be improved by selecting values that are closer to (or that result in calculating a closer value to) a final quality setting. The machine learning technique can classify the content of the image (e.g., landscape, human, dog, cityscape, and the like) and can store initial or reference values based on the classification. The initial values can then be retrieved in an initialization step or as part of a determination/calculation step. This machine learning technique can reduce the number of steps in a binary determination/calculation step and/or step-by-step iterative process. In other words, the machine learning technique can be used to predict the final quality setting for a given image based on image statistics for an application or across many applications.

In an example implementation, the prediction function can be machine learned/trained using a collection of images from an application as training dataset. Then the methods described above can be used to find a correct quality setting for each image in the training dataset. As an example, an image can be compressed at a reference quality setting qs_ref, and M@qs_ref can be calculated. A regression model (linear or non-linear) can be trained with M@qs_ref as input and qs_final@M_target as output. After the model is trained, the model can be used to predict a quality setting with as few as one compression iteration at a reference quality selected using the trained model.

In the example of FIG. 3, an image encoder system 300 may be, or may include, at least one computing device and can represent virtually any computing device configured to perform the methods described herein. As such, the image encoder system 300 can include various components which may be utilized to implement the techniques described herein, or different or future versions thereof. By way of example, the image encoder system 300 is illustrated as including at least one processor 305, as well as at least one memory 310 (e.g., a non-transitory computer readable storage medium).

FIG. 3 illustrates the image encoder system 300 according to at least one example implementation. As shown in FIG. 3, the image encoder system 300 includes the at least one processor 305, the at least one memory 310, a controller 320, and an image encoder 325. The at least one processor 305, the at least one memory 310, the controller 320, and the image encoder 325 are communicatively coupled via bus 315.

The at least one processor 305 may be utilized to execute instructions stored on the at least one memory 310, so as to thereby implement the various features and functions described herein, or additional or alternative features and functions. The at least one processor 305 and the at least one memory 310 may be utilized for various other purposes. In particular, the at least one memory 310 can represent an example of various types of memory and related hardware and software which might be used to implement any one of the modules described herein.

The at least one memory 310 may be configured to store data and/or information associated with the image encoder system 300. For example, the at least one memory 310 may be configured to store codecs associated with encoding an image. For example, the at least one memory may be configured to store code associated with encoding a JPEG and/or WebP image. The at least one memory 310 may be a shared resource. For example, the image encoder system 300 may be an element of a larger system (e.g., a server, a personal computer, a mobile device, and the like). Therefore, the at least one memory 310 may be configured to store data and/or information associated with other elements (e.g., image/video serving, web browsing or wired/wireless communication) within the larger system.

The controller 320 may be configured to generate various control signals and to communicate the control signals to various blocks in image encoder system 300. The controller 320 may be configured to generate the control signals to implement the techniques described above. For example, the controller 320 may be configured to generate parameters including a quality setting used in an adaptive compression technique. The controller 320 may be configured to control the image encoder 325 to encode an image, a sequence of images, and the like according to example implementations. More details related to the functions and operation of the image encoder 325 and controller 320 will be described below in connection with at least FIG. 4.

The image encoder 325 may be configured to receive an input image 5 (e.g., an original image) and to output a compressed (e.g., encoded) image 10. The image encoder 325 may further convert the image into a matrix of blocks (hereinafter referred to as blocks). For example, an image may be converted to a 16×16, a 16×8, an 8×8, an 8×4, a 4×4, a 4×2, a 2×2 or the like matrix of blocks, each having a number of pixels. Although these example matrices are listed, example implementations are not limited thereto.

The compressed image 10 may represent the output of the image encoder system 300. For example, the compressed image 10 may represent an encoded image. For example, the compressed image 10 may be ready for storage in memory and/or transmission to a receiving device (not shown). For example, the compressed image 10 may be transmitted to a system transceiver (not shown) for transmission to the receiving device.

The at least one processor 305 may be configured to execute computer instructions associated with the controller 320 and/or the image encoder 325. The at least one processor 305 may be a shared resource. For example, the image encoder system 300 may be an element of a larger system (e.g., a server, a mobile device and the like). Therefore, the at least one processor 305 may be configured to execute computer instructions associated with other elements (e.g., image/video serving, web browsing or wired/wireless communication) within the larger system.

FIG. 4 illustrates a flow diagram for the image encoder 325 shown in FIG. 3 according to at least one example implementation. The image encoder 325 includes a prediction block 410, a transform block 415, a quantization block 420, an entropy encoding block 425, an inverse quantization block 430, an inverse transform block 435, a reconstruction block 440, a loop filter block 445. Other structural variations of the image encoder 325 can be used to compress input image 5. As shown in FIG. 4, dashed lines represent a reconstruction path amongst the several blocks and solid lines represent a forward path amongst the several blocks.

Each of the aforementioned blocks may be executed as software code stored in a memory (e.g., at least one memory 310) associated with an image encoder system (e.g., as shown in FIG. 3) and executed by at least one processor (e.g., at least one processor 305) associated with the image encoder system. However, alternative implementations are contemplated such as a image encoder embodied as a special purpose processor. For example, each of the aforementioned blocks (alone and/or in combination) may be an application-specific integrated circuit, or ASIC. For example, the ASIC may be configured as the transform block 415 and/or the quantization block 420.

The prediction block 410 may be configured to utilize image coherence (e.g., pixels that have not changed as compared to previously encoded pixels). For example, prediction may include intra-frame prediction. Intra-frame prediction relates to predicting the pixel values in a block of a picture relative to reference samples in neighboring, previously coded blocks of the same picture. In intra-frame prediction, a sample is predicted from reconstructed pixels within the same frame for the purpose of reducing the residual error that is coded by the transform (e.g., entropy encoding block 425) and entropy coding (e.g., entropy encoding block 425) part of a predictive transform codec.

The transform block 415 may be configured to convert the values of the pixels from the spatial domain to transform coefficients in a transform domain. The transform coefficients may correspond to a two-dimensional matrix of coefficients that is ordinarily the same size as the original block. In other words, there may be as many transform coefficients as pixels in the original block. However, due to the transform, a portion of the transform coefficients may have values equal to zero.

The transform block 415 may be configured to transform the residual (from the prediction block 410) into transform coefficients in, for example, the frequency domain. Typically, transforms include the Karhunen-Loéve Transform (KLT), the Discrete Cosine Transform (DCT), the Singular Value Decomposition Transform (SVD) and the asymmetric discrete sine transform (ADST).

The quantization block 420 may be configured to reduce the data in each transformation coefficient. Quantization may involve mapping values within a relatively large range to values in a relatively small range, thus reducing the amount of data needed to represent the quantized transform coefficients. The quantization block 420 may convert the transform coefficients into discrete quantum values, which are referred to as quantized transform coefficients or quantization levels. For example, the quantization block 420 may be configured to add zeros to the data associated with a transformation coefficient. For example, an encoding standard may define 128 quantization levels in a scalar quantization process.

The quality setting discussed above can be an encoder parameter setting associated with the quantization block 420 shown as quality setting 405. As mentioned above, the quantization block 420 can be configured to convert the transform coefficients into discrete quantum values. The number of, and/or value for, the discrete quantum values can affect the quality of a reconstructed image. For example, a relatively high number of discrete quantum values can have a relatively higher quality of the reconstructed image. Conversely, a relatively low number of discrete quantum values can have a relatively lower quality of the reconstructed image. Further, the number of nonzero discrete quantum values can affect the quality of a reconstructed image. For example, a relatively high number of nonzero discrete quantum values can have a relatively higher quality of the reconstructed image. Conversely, a relatively low number of nonzero discrete quantum values can have a relatively lower quality of the reconstructed image. Therefore, the quality setting 405 can correspond to the number of discrete quantum values used in the quantization block 420 and/or influence the number of nonzero discrete quantum values. Accordingly, modifying the quality setting 405 (e.g., in step S140 or S215 above) can include changing the number of and/or value for discrete quantum values in each iteration of the adaptive compression technique described above as implemented in the quantization block 420.

In an example implementation, the compression quality level may be based on a quantization table (or matrix) used to filter high frequency transform coefficients (e.g., DCT transformed coefficients). The quantization table includes a plurality of numbers based on a block size. For example, a JPEG quantization table can include 64 integers (e.g., as an 8×8 matrix). The quantization block 420 can be configured to select one of a plurality of quantization tables based on the quality setting 405. Accordingly, varying the quality setting 405 can cause the quantization block 420 to select a different quantization table. Therefore, varying the quality setting 405 can cause varying of the filtering of the high frequency transform coefficients. Thus varying the compression quality level. Accordingly, modifying the quality setting 405 (e.g., in step S140 or S215 above) can cause the selection of a different quantization table in each iteration of the adaptive compression technique described above as implemented in the quantization block 420.

In another example implementation, the compression quality level may be a ZBIN value or based on a ZBIN value. The first portion of the transformed data block may be the data values (or a subset of the data values) that are determined to be at or below the compression quality level. For example, in quantization processes, transform coefficients (e.g., DCT transformed coefficients) may be processed in a defined scan order such as zigzag order instead of raster order (i.e. line-by-line order). In order to better allocate the available bits, a ZBIN can be adopted to attenuate coefficients near zero. For example, if a transform coefficient is out of the ZBIN range, the transform coefficient may be quantized and stored, otherwise (or in addition), the quantized transform coefficient may be set to a default value (e.g., zero). The ZBIN may include two parts (e.g., portions): a constant base ZBIN and a varying boost. For a specific transform coefficient, the varying boost part may be determined by the number of continuous zero quantized transform coefficients since the last non-zero quantized coefficient. However, the varying boost part is typically small as compared to the constant base ZBIN.

ZBIN values may be based on, or selected based on, an encoder parameter setting associated with a quantization block of the encoder (commonly called a quantization parameter (Q)). Higher values for the quantization parameter Q typically result in more quantization and higher image compression. As a result, a higher value of the quantization parameter Q may result in lower quality image when reconstructed. By contrast, lower values for the quantization parameter Q typically result in less quantization. As a result, a lower value of the quantization parameter Q may result in higher quality image when reconstructed.

Therefore, the quantization parameter Q may be based on a target (and/or desired) image quality and/or compression quality level. Accordingly, ZBIN values may be based on a target (and/or desired) image quality and/or compression quality level. The base ZBIN may be directly proportional to the quantization parameter Q, namely, base ZBIN=K*Q, where K is a constant and Q is the quality setting or based on the quality setting. Accordingly, modifying the quality setting 405 (e.g., in step S140 or S215 above) can change the ZBIN value in each iteration of the adaptive compression technique described above as implemented in the quantization block 420.

The quantized transform coefficients are then entropy encoded by entropy encoding block 425. The entropy-encoded coefficients, together with the information required to decode the block, such as the type of prediction used, motion vectors and the quantization parameter, are then output as the compressed image 10. The compressed image 10 can be formatted using various techniques, such as run-length encoding (RLE) and zero-run coding.

The reconstruction path performs functions that are similar to functions that take place during a decoding process including inverse quantizing the quantized transform coefficients at the inverse quantization block 430 and inverse transforming the inverse quantized transform coefficients at the inverse transform block 435 in order to produce a derivative residual block (derivative residual). At the reconstruction block 440, the prediction block that was predicted at the prediction block 410 can be added to the derivative residual to create a reconstructed block. A loop filter 445 can then be applied to the reconstructed block to reduce distortion such as blocking artifacts.

The image encoder 325 described above with regard to FIG. 4 includes the blocks shown. However, example implementations are not limited thereto. Additional blocks may be added based on the different image encoding configurations and/or techniques used. Further, each of the blocks shown in the image encoder 325 described above with regard to FIG. 4 may be optional blocks based on the different image encoding configurations and/or techniques used.

Figure 5:
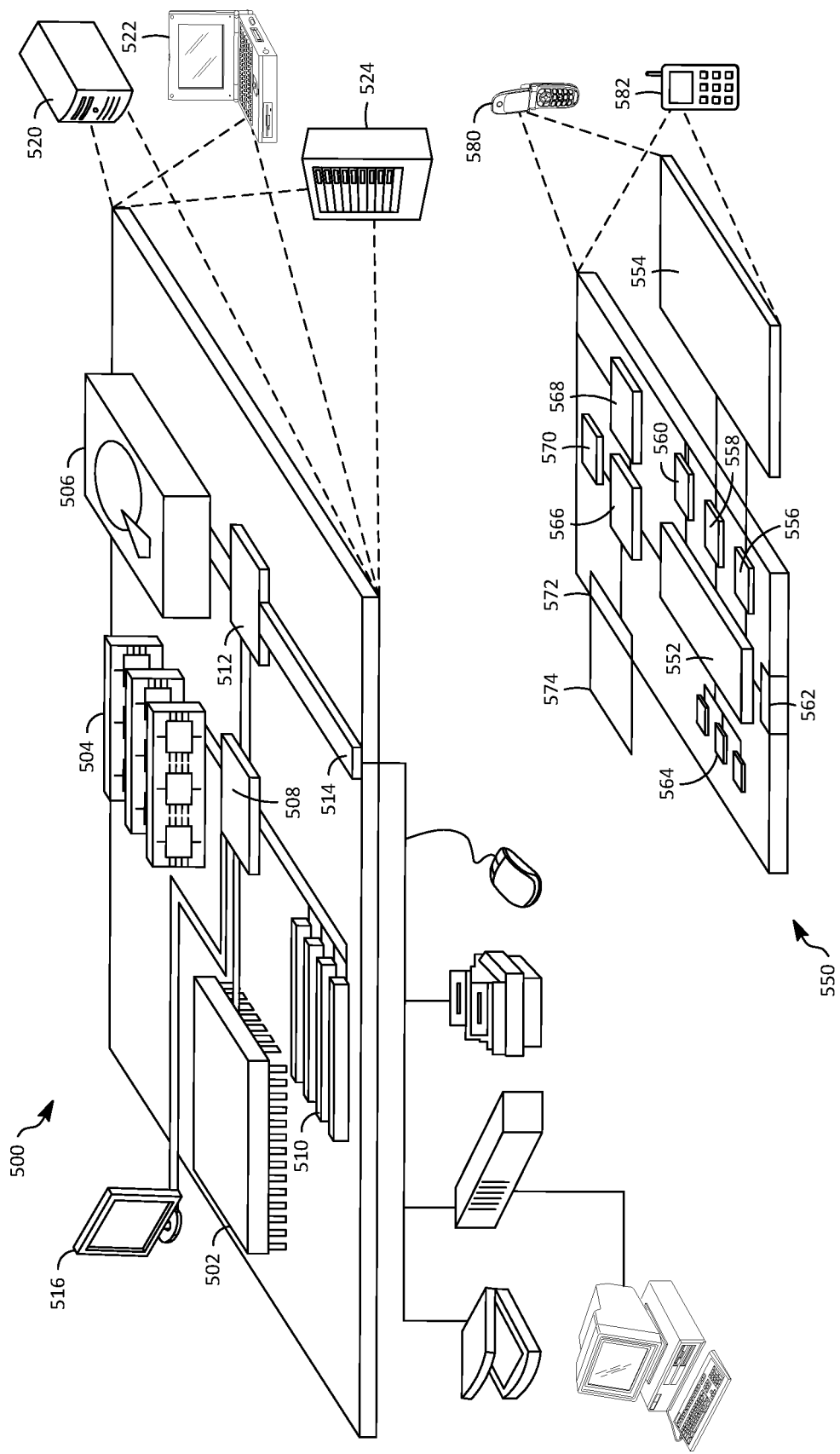
FIG. 5 is a schematic block diagram of a computer device and a mobile computer device that can be used to implement the techniques described herein.

FIG. 5 is a schematic block diagram of a computer device and a mobile computer device that can be used to implement the techniques described herein. FIG. 5 is an example of a generic computer device 500 and a generic mobile computer device 550, which may be used with the techniques described here. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing partitions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552, that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Some of the above example implementations are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example implementations. Example implementations, however, be embodied in many alternate forms and should not be construed as limited to only the implementations set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example implementations. As used herein, the term and/or includes any and all combinations of one or more of the associated listed items.

It will be understood that when an element is referred to as being connected or coupled to another element, it can be directly connected or coupled to the other element or intervening elements may be present. In contrast, when an element is referred to as being directly connected or directly coupled to another element, there are no intervening elements present. Other words used to describe the relationship between elements should be interpreted in a like fashion (e.g., between versus directly between, adjacent versus directly adjacent, etc.).

The terminology used herein is for the purpose of describing particular implementations only and is not intended to be limiting of example implementations. As used herein, the singular forms a, an, and the are intended to include the plural forms as well, unless the context clearly indicates otherwise. It will be further understood that the terms comprises, comprising, includes and/or including, when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example implementations belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example implementations and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative implementations, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as processing or computing or calculating or determining of displaying or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example implementations are typically encoded on some form of non-transitory program storage medium or implemented over some type of transmission medium. The program storage medium may be magnetic (e.g., a floppy disk or a hard drive) or optical (e.g., a compact disk read only memory, or CD ROM), and may be read only or random access. Similarly, the transmission medium may be twisted wire pairs, coaxial cable, optical fiber, or some other suitable transmission medium known to the art. The example implementations not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or implementations herein disclosed irrespective of whether or not that particular combination has been specifically enumerated in the accompanying claims at this time.

What is claimed is:

1. A method comprising:
   predicting a quality setting and a quality setting update using a machine learning technique based on a classification of a content of an image;
   determining a quality range based on a target quality indicated using an application implementing the method, the quality range includes the target quality;
   compressing the image using the quality setting;
   determining a quality of the compressed image using a quality metric;
   determining if the quality of the compressed image is within the quality range;
   in response to determining the quality of the compressed image is within the quality range, store the compressed image; and
   in response to determining the quality of the compressed image is not within the quality range:
      modifying the quality setting based on the quality setting update, and
      compressing the image using the modified quality setting.

2. The method of claim 1, wherein
   determining the quality based on the quality metric of the compressed image includes calculating quality using the quality metric based on the image and the compressed image, and
   the quality range includes a minimum value equal to a target PSNR and a maximum value equal to the target PSNR plus a threshold value.

3. The method of claim 1, wherein modify the quality setting includes:
   determining if the quality of the compressed image is above a maximum value, determining if the quality of the compressed image is below a minimum value, in response to determining the quality of the compressed image is above the maximum value, modify the quality setting to cause the quality of the compressed image to be reduced, and in response to determining the quality of the compressed image is below the minimum value, modify the quality setting to cause the quality of the compressed image to be increased.

4. The method of claim 1, wherein the quality metric includes one of a peak signal to noise ratio (PSNR), a structural similarity (SSIM), a perceptual distortion metric, a Sarnoff Just-Noticeable Difference (JND), a Visible Differences Predictor (VDP), a Visual Information Fidelity (VIF), an application-specific model or a file size.

5. The method of claim 1, wherein the quality setting corresponds to a number of discrete quantum values used in a quantization step for compressing the image.

6. The method of claim 1, wherein the quality setting corresponds to a quantization table used in a quantization step for compressing the image.

7. The method of claim 1, wherein
the quality setting corresponds to a value used in a quantization step for compressing the image for a WebP image format, and
the value is proportional to a quantization parameter.

8. A non-transitory computer-readable storage medium having stored thereon computer executable program code which, when executed on a computer system, causes the computer system to perform steps comprising:
predicting a quality setting and a quality setting update using a machine learning technique based on a classification of a content of an image, the machine learning technique being trained based on image statistics associated with an application implementing the steps;
(A) compressing the image using the quality setting;
(B) determining a quality of the compressed image using a quality metric;
(C) determining if the quality of the compressed image is within a quality range;
(D) in response to determining the quality of the compressed image is within the quality range, store the compressed image; and
(E) in response to determining the quality of the compressed image is not within the quality range,
modifying the quality setting based on the quality setting update, and
repeating step A with the modified quality setting, B, C, D and E.

9. The computer-readable storage medium of claim 8, wherein
determining the quality of the compressed image includes calculating a peak signal to noise ratio (PSNR) based on the image and the compressed image, and
the quality range includes a minimum value equal to a target PSNR and a maximum value equal to the target PSNR plus a threshold value.

10. The computer-readable storage medium of claim 8, wherein modify the quality setting includes:
determining if the quality of the compressed image is above a maximum value,
determining if the quality of the compressed image is below a minimum value, in response to determining the quality of the compressed image is above the maximum value, modify the quality setting to cause the quality of the compressed image to be reduced, and in response to determining the quality of the compressed image is below the minimum value, modify the quality setting to cause the quality of the compressed image to be increased.

11. The computer-readable storage medium of claim 8, wherein the quality metric includes one of a peak signal to noise ratio (PSNR), a structural similarity (SSIM), a perceptual distortion metric, a Sarnoff Just-Noticeable Difference (JND), a Visible Differences Predictor (VDP), a Visual Information Fidelity (VIF), an application-specific model or a file size.

12. The computer-readable storage medium of claim 8, wherein the quality setting corresponds to a number of discrete quantum values used in a quantization step for compressing the image.

13. The computer-readable storage medium of claim 8, wherein the quality setting corresponds to a quantization table used in a quantization step for compressing the image.

14. The computer-readable storage medium of claim 8, wherein
the quality setting corresponds to a value used in a quantization step for compressing the image for a WebP image format, and
the value is proportional to a quantization parameter.

15. A method comprising:
predicting a classification based on a content of an image using a machine learning technique trained based on image statistics associated with an application implementing the method;
(A) determining a minimum quality setting based on the classification using a lookup table;
(B) determining a maximum quality setting based on the classification using the lookup table;
(C) calculating a quality setting as equal to a sum of the minimum quality setting and the maximum quality setting divided by two;
(D) compressing the image using the quality setting;
(E) determining a peak signal to noise ratio (PSNR) based on the image and the compressed image;
(F) determining if a difference between the PSNR and a target PSNR is less than a threshold value;
(G) in response to determining the difference between the PSNR and the target PSNR is less than the threshold value, store the compressed image; and
(H) in response to determining the difference between the PSNR and the target PSNR is not less than the threshold value,
determine if the PSNR is greater than the target PSNR,
in response to determining the PSNR is greater than the target PSNR, set the minimum quality setting equal to the quality setting,
in response to determining the PSNR is not greater than the target PSNR, set the maximum quality setting equal to the quality setting, and
repeat steps C, D, E, F, G and H.

16. The method of claim 15, wherein the quality setting corresponds to a number of discrete quantum values used in a quantization step for compressing the image.

17. The method of claim 15, wherein the quality setting corresponds to a quantization table used in a quantization step for compressing the image.

18. The method of claim 15, wherein the target PSNR is determined based on a target quality indicated using the application.

19. The method of claim 1, wherein the machine learning technique being trained based on image statistics associated with the application implementing the method.

20. The non-transitory computer-readable storage medium of claim 8, wherein the steps further comprise:
   determining the quality range based on a target quality identified using the application, the quality range includes the target quality.

* * * * *